US012660049B2

(12) United States Patent
Kim et al.

(10) Patent No.: US 12,660,049 B2
(45) Date of Patent: Jun. 16, 2026

(54) INDUCTION HEATING APPARATUS AND METHOD FOR CONTROLLING THE SAME

(71) Applicant: LG ELECTRONICS INC., Seoul (KR)

(72) Inventors: Gwangrok Kim, Seoul (KR); Jung Youn Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1049 days.

(21) Appl. No.: 17/667,963

(22) Filed: Feb. 9, 2022

(65) Prior Publication Data

US 2022/0256657 A1 Aug. 11, 2022

(30) Foreign Application Priority Data

Feb. 10, 2021 (KR) ........................ 10-2021-0019285

(51) Int. Cl.
| | |
|---|---|
| *H05B 6/06* | (2006.01) |
| *H02M 1/08* | (2006.01) |
| *H02M 7/5387* | (2007.01) |
| *H05B 6/12* | (2006.01) |
| *H02M 5/458* | (2006.01) |

(52) U.S. Cl.
CPC .............. H05B 6/065 (2013.01); H02M 1/08 (2013.01); H02M 7/53871 (2013.01); H05B 6/1272 (2013.01); *H02M 5/4585* (2013.01); *H05B 2213/05* (2013.01)

(58) Field of Classification Search
CPC ............... H02M 7/53871; H02M 1/08; H02M 5/4585; H05B 6/062; H05B 6/1272; H05B 6/065; H05B 2213/05
See application file for complete search history.

(56) References Cited

U.S. PATENT DOCUMENTS

2018/0301934 A1* 10/2018 Prabhala ............. H02J 7/00714
2020/0008272 A1* 1/2020 Suga ...................... H05B 6/065

FOREIGN PATENT DOCUMENTS

| EP | 3 927 114 A1 | 12/2021 |
|---|---|---|
| JP | 2007/012490 | 1/2007 |
| JP | 4781295 | 9/2011 |
| JP | 2012-104418 | 5/2012 |
| KR | 20-0465232 | 2/2013 |
| WO | WO 2020/166061 A1 | 8/2020 |

OTHER PUBLICATIONS

Korean Office Action issued in Application No. 10-2021-0019285 dated Apr. 21, 2025.
European Office Action dated Dec. 17. 2025 issued in Application No. 22155946.1.
Extended European Search Report dated Jul. 8, 2022 issued in Application 22155946.1.

* cited by examiner

*Primary Examiner* — Edward F Landrum
*Assistant Examiner* — Kuangyue Chen
(74) *Attorney, Agent, or Firm* — KED & ASSOCIATES, LLP

(57) ABSTRACT

An induction heating apparatus may determine a required power value of a heating zone, based on a power level set for the heating zone, detect a container by using an inner working coil and an outer working coil, determine a working coil to be driven, based on results of the detection of the container, determine a driving mode of the working coil to be driven, based on the required power value, and provide a control signal, based on the driving mode.

8 Claims, 14 Drawing Sheets

INDUCTION HEATING APPARATUS AND METHOD FOR CONTROLLING THE SAME

CROSS-REFERENCE TO RELATED APPLICATION

This application claims priority under 35 U.S.C. § 119 to Korean Application No. 10-2021-0019285, filed Feb. 10, 2021, whose entire subject matter is hereby incorporated by reference.

BACKGROUND

1. Field

Disclosed herein are an induction heating apparatus and a method for controlling the same.

2. Background

Induction heating apparatuses may generate eddy current in a container made of metal by using a magnetic field generated around a working coil to heat the container. As an induction heating apparatus operates, AC current is supplied to a working coil. Accordingly, an induction magnetic field is generated around the working coil disposed in the induction heating apparatus. As the magnetic line of force of the generated induction magnetic field passes through the bottom of the container including a metallic ingredient placed over the working coil, eddy current is generated inside the bottom of the container. As the generated eddy current flows in the container, the container itself is heated.

At least one heating zone is formed on an upper surface of the induction heating apparatus, and a working coil for heating a container is disposed under the heating zone. While the driving of the working coil is controlled, a power level of the heating zone, set by a user, and a size of a container need to be considered respectively.

An electric range capable of adjusting the size of a burner (a heating zone) is disclosed in KR Utility Model Registration No. 20-0465232, the subject matter of which is incorporated herein by reference. FIG. 1 is a perspective view showing an electric range.

Referring to FIG. 1, the electric range includes a case body 100, heater devices 250, 290, an upper panel part 500, a key input part 600, and a distance sensor part 700.

The case body 100 provides a space in which components constituting the electric range are stored. The case body 100 is formed into a box that is open upward.

The upper panel part 500 is disposed over the heater devices 250, 290, and is coupled to the case body 100. The upper panel part 500 transmits heat generated by the heater devices 250, 290.

The heater devices 250, 290 includes one or more heater units (or heaters). Each of the heater units includes a plurality of unit heater modules, and each of the unit heater modules can be controlled independently. In the FIG. 1 embodiment, the heater devices 250, 290 includes two heater units (i.e., a first heater unit 250 and a second heater unit 290).

The first heater unit 250 includes four unit heater modules, and the second heater unit 290 includes three unit heater modules. The first heater unit 250 includes a first unit heater module 210, a second unit heater module 220, a third unit heater module 230, and a fourth unit heater module 240.

The second heater unit 290 includes a fifth unit heater module 260, a sixth unit heater module 270, and a seventh unit heater module 280.

The key input part 600 is disposed on the upper panel part 500, and the key input part 600 may be used to input an instruction signal for operating the electric range, such as the on/off of the electric range, the adjustment of heating power, the setting of a timer and/or the like.

The distance sensor part 700 is disposed on the upper panel part 500, measures a distance to a container placed on (or provided on) the upper panel part 500, and transmits results of the measurement to a container size calculating part. The distance sensor part 700 can be an infrared distance sensor or an ultrasonic distance sensor.

A controller of the electric range, illustrated in FIG. 1, adjusts the size of a heating zone by turning on/off the unit heater modules (included in each of the heater units 250, 290), based on the size of a container which is estimated with the distance sensor part 700 such as an infrared distance sensor or an ultrasonic distance sensor.

For example, the controller of the electric range turns on the first to third unit heater modules 210, 220, 230, and turns off the fourth unit heater module 240 that does not contact a container when the size of the container corresponds to the diameter of the third unit heater module 230, such that the size of the heating zone varies to match the size of the container.

A physical sensor (such as an infrared distance sensor or an ultrasonic distance sensor) may be used to detect the size of a container. When an induction heating apparatus is provided with a physical sensor, the induction heating apparatus may be designed in a complex manner, and may incur a large amount of manufacturing costs. Additionally, the size of a container is estimated based on a distance between the distance sensor part 700 and the container. Accordingly, the size of the area in which a heater unit overlaps the container actually is not taken into account, making it difficult to control a working coil accurately.

A method of controlling the on/off of the unit heater modules based on an estimated size of a container may be disclosed. That is, a method of adjusting the output power value of a working coil based on the size of a container or the power level of a heating zone is not specifically disclosed in disadvantageous arrangements.

BRIEF DESCRIPTION OF THE DRAWINGS

The embodiments will be described in detail with reference to the following drawings in which like reference numerals refer to like elements and wherein.

DETAILED DESCRIPTION

Figure 1:
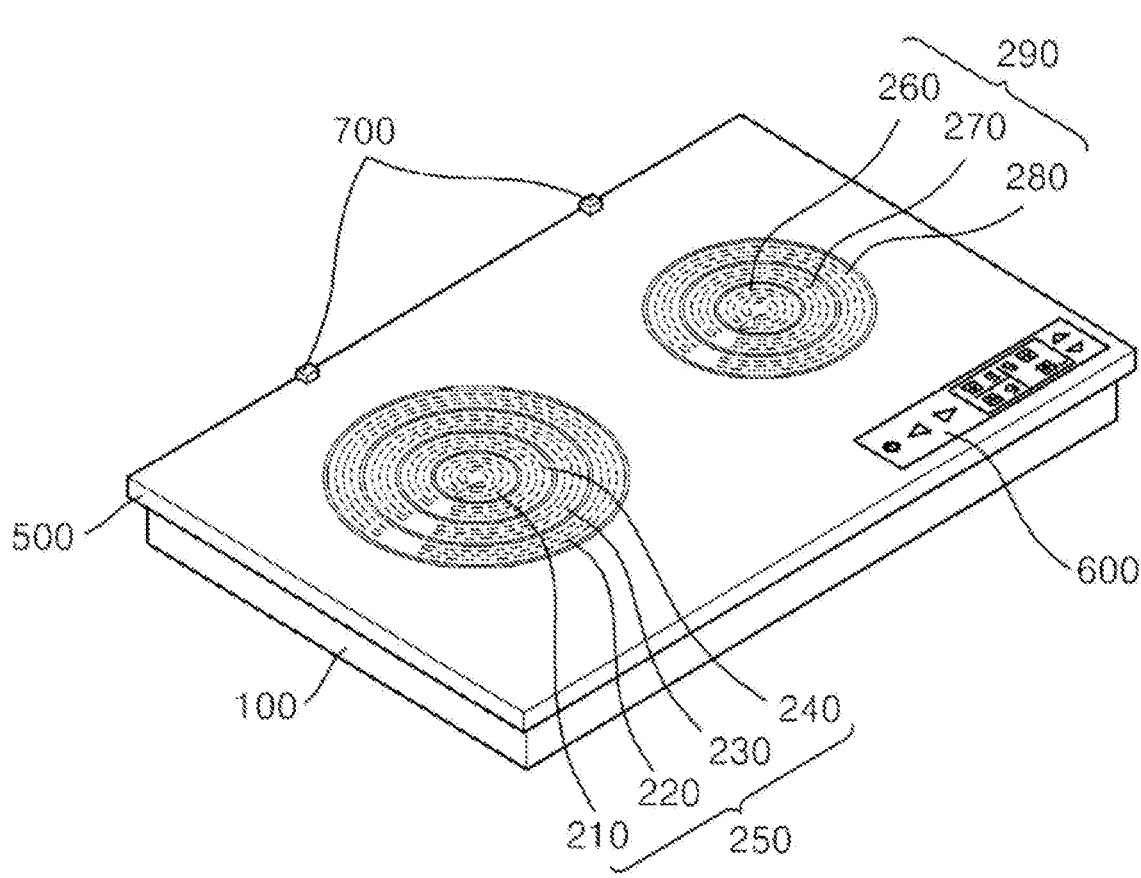
FIG. 1 is a perspective view showing an electric range.

The above-described aspects, features and advantages are specifically described hereafter with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
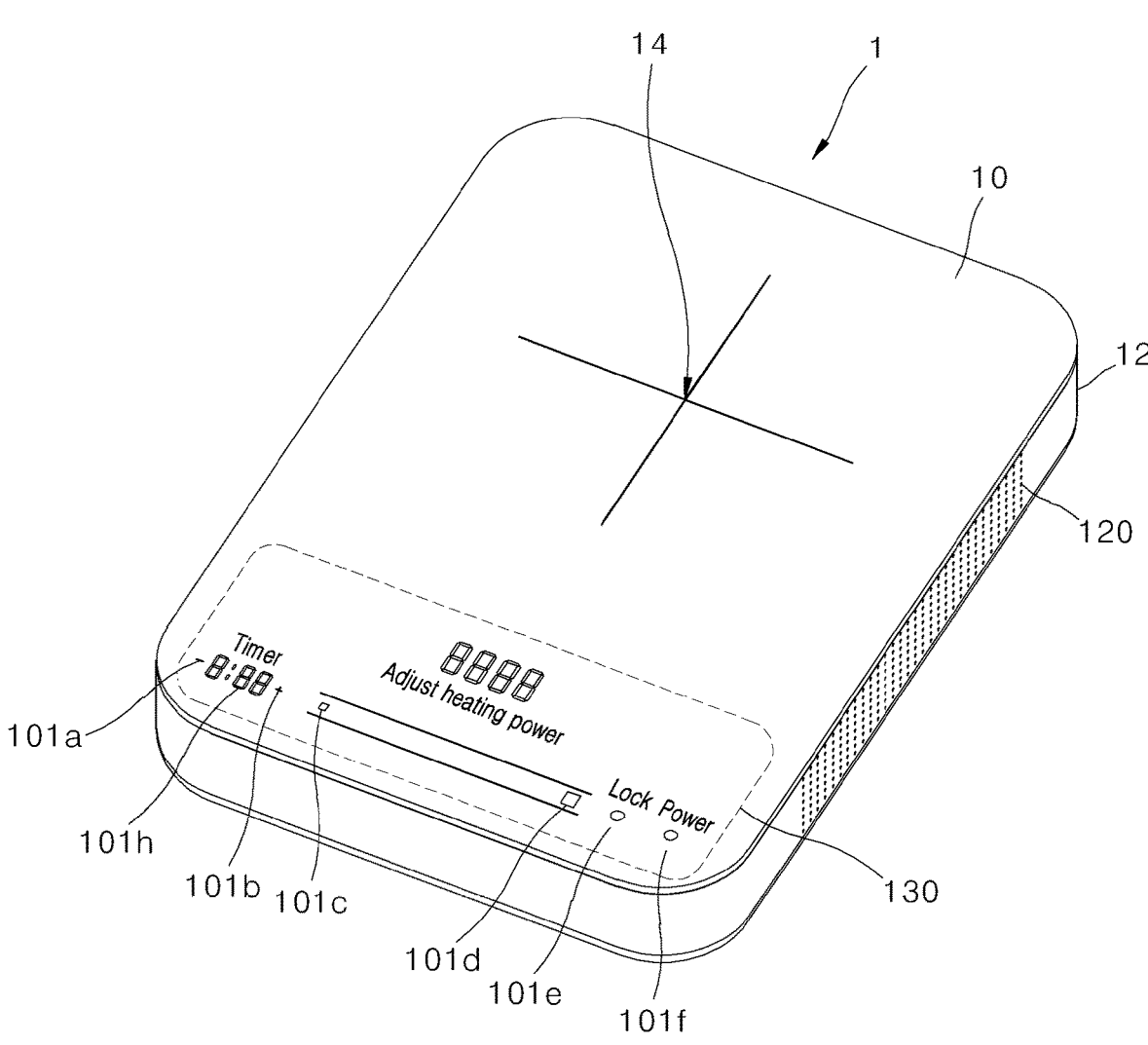
FIG. 2 is a perspective view showing the exterior of an induction heating apparatus of one embodiment.
Figure 3:
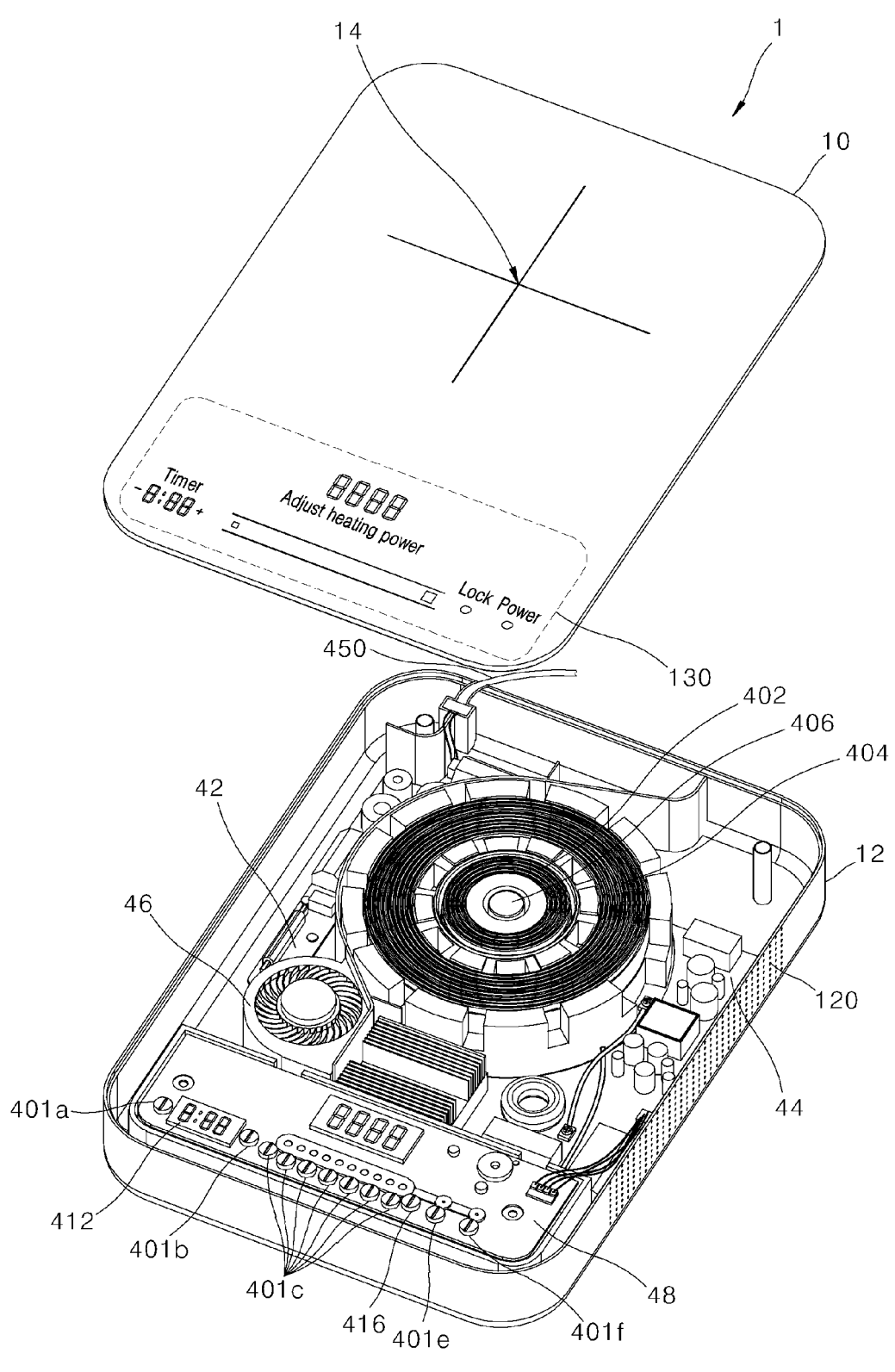
FIG. 3 is a perspective view showing the configuration in the induction heating apparatus of one embodiment.

FIG. 2 is a perspective view showing the exterior of an induction heating apparatus of one embodiment. FIG. 3 is a perspective view showing the configuration in the induction heating apparatus of one embodiment. The induction heating apparatus 1 of one embodiment includes an upper plate 10 and a case 12 that form the exterior of the induction heating apparatus 1.

The case 12 forms an inner space having predetermined volume, and components of the induction heating apparatus 1 described hereafter are disposed in the inner space of the case 12. In the embodiment of FIGS. 2 and 3, the case 12 is formed into a cuboid that has edges having a predetermined curvature and has one open surface. However, the shape of the case 12 may vary depending on embodiments.

Additionally, a plurality of ventilation openings 120 for discharging heat (generated by components disposed in the inner space of the case 12) out of the case 12 is formed on at least one lateral surface of the case 12. In the embodiments of FIGS. 1 and 2, the ventilation openings 120 are formed only on one lateral surface of the case 12. However, the positions and numbers of the ventilation openings 120 may vary depending on embodiments.

The upper plate 10 is coupled to the open surface (i.e., the upper surface, of the case 12) and seals the inner space of the case 12. The upper plate 10 is formed into a flat plate corresponding to the upper surface of the case 12, and the upper plate 10 may be made of a material (e.g., glass or ceramics) exhibiting electric insulation and thermal conductivity.

A heating zone 14 for heating a container is provided on the upper surface of the upper plate 10. For the heating zone to be easily identified, a figure or a symbol indicating the heating zone 14 is marked on the upper surface of the upper plate 10. In the embodiment(s) of FIGS. 1 and 2, the heating zone 14 is marked as a cross (+). However, the heating zone 14 may be marked as various symbols or figures such as a circle or a rectangle and the like depending on embodiments.

A manipulation zone 130 for controlling an operation of the induction heating apparatus 1 is formed on the upper surface of the upper plate 10. The manipulation zone 130 includes a plurality of buttons and a display part (or display).

A user may touch a timer button 101a, 101b to adjust cooking time. The cooking time set by the user is displayed on a display part 101h. Additionally, the user may set a power level of the heating zone 14 by touching a heating power adjusting button 101c, 101d, to adjust magnitude of heat energy to be applied to a container. The power level of the heating zone 14, set by the user, is displayed on a display part 101h.

The user may touch a lock button 101e to lock or unlock the induction heating apparatus 1. In a state of being locked, the induction heating apparatus 1 does not operate although the user touches another button except for the lock button 101e. In a state of being unlocked, the induction heating apparatus 1 may be controlled as the user touches another button except for the lock button 101e.

The user may touch a power button 101f to change the state of the induction heating apparatus 1 to an on state or an off state.

Referring to FIG. 3, a first circuit board 42, a second circuit board 44, an air blowing fan 46, a third circuit board 48, working coils 402, 404, and a temperature sensor 406 are disposed in the inner space (i.e., the space sealed by the upper plate 10 and the case 12) of the induction heating apparatus 1.

The first circuit board 42 filters power that is supplied from an external power source through a power cable 450, and supplies the filtered power to the first circuit board 42. A filter circuit for filtering power may be mounted onto the first circuit board 42.

The second circuit board 44 converts the power supplied through the first circuit board 42, and supplies the converted power to the working coils 402, 404 and/or controls the driving of the induction heating apparatus 1. A rectifying circuit, a smoothing circuit, an inverter circuit, a controller, and/or a driving circuit, which are described below, may be mounted onto the second circuit board 44.

The air blowing fan 46 operates as the working coils 402, 404 operates, and discharges air in the case 12 outward through the ventilation opening(s) 120.

Additionally, a plurality of touch sensors 401a, 401b, 401c, 401e, 401f for inputting the user's instruction and a display part(s) 412, 414, 416 are mounted onto the third circuit board 48. An input signal input through the touch sensors 401a, 401b, 401c, 401e, 401f is delivered to the controller. Information (e.g., cooking time or a power level and the like) based on the input signal input through the touch sensor(s) 401a, 401b, 401c, 401e, 401f is displayed on the display part(s) 412, 414, 416.

The working coil(s) 402, 404 is disposed in a position corresponding to the heating zone 14 formed on the upper plate 10. For example, the center of the working coil(s) 402, 404 may be aligned with the center of the heating zone 14.

In one embodiment, the working coil(s) 402, 404 includes an inner working coil 402 and an outer working coil 404. In the FIG. 3 embodiment, the working coil includes two working coils (i.e., an inner working coil 402 and an outer working coil 404). However, in another embodiment, the working coil may include three or more working coils.

The inner working coil 402 shares the center with the outer working coil 404. In other words, the center of the inner working coil 402 is the same as the center of the outer working coil 404. The diameter of the outer working coil 404 is greater than the diameter of the inner working coil 402. The outer working coil 404 and the inner working coil 402 are disposed on the same flat surface to surround an outer surface of the inner working coil 402.

The inner working coil 402 and the outer working coil 404 operate independently. For example, as the user inputs an instruction to initiate heating, only the inner working coil 402 can be driven alone, or only the outer working coil 404 can be driven alone, or both the inner working coil 402 and the outer working coil 404 can be driven at the same time.

The temperature sensor 406 is disposed in the central area of the working coil 402, 404. The temperature sensor 406 senses the temperature of a container during cooking and delivers the sensed temperature to the controller. The controller may perform a protection function of stopping the driving of the working coil(s) 402, 404 when the temperature sensed by the temperature sensor 406 is greater than a predetermined reference temperature.

Figure 4:
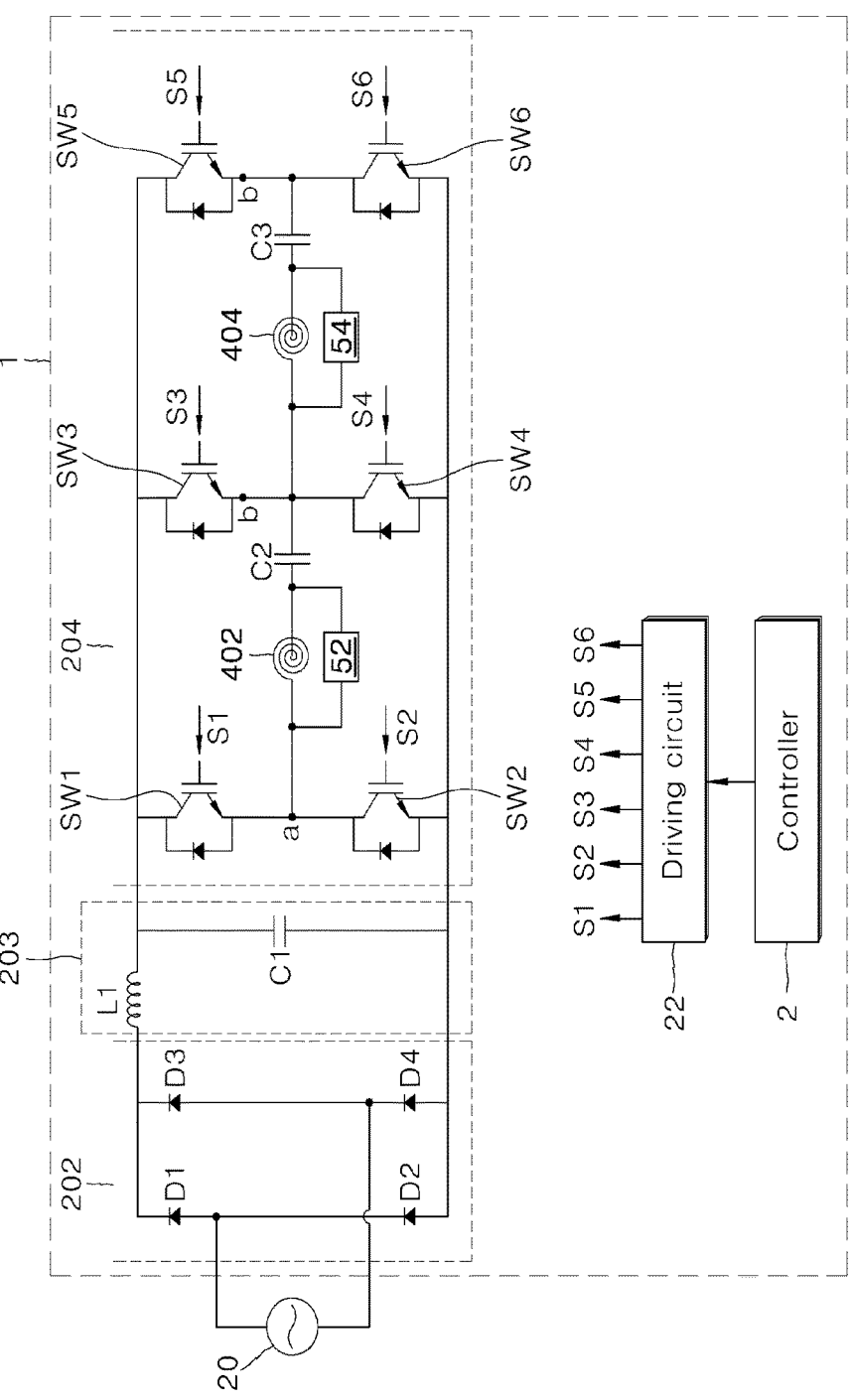
FIG. 4 is a circuit diagram of the induction heating apparatus of one embodiment.

FIG. 4 is a circuit diagram of the induction heating apparatus of one embodiment. The induction heating apparatus 1 shown in FIG. 4 includes a rectifying circuit 202, a smoothing circuit 203, an inverter circuit 204, the inner working coil 402, the outer working coil 404, a controller 2, and a driving circuit 22.

The rectifying circuit 202 includes a plurality of diode elements D1, D2, D3, D4. As illustrated in FIG. 4, the rectifying circuit 202 may be a bride diode circuit, and depending on the embodiment, may be another type of circuit. The rectifying circuit 202 rectifies AC input voltage supplied from an external power supply device 20 and outputs voltage having a pulse waveform.

The smoothing circuit 203 smooths the voltage rectified by the rectifying circuit 202 and outputs DC link voltage. The smoothing circuit 203 may include a first inductor L1 and a DC link capacitor C1.

The inverter circuit 204 (or inverter) converts current output from the smoothing circuit 203 and supplies the converted current respectively to the inner working coil 402 and the outer working coil 404.

In one embodiment, the inverter circuit 204 includes a first switching element SW1, a second switching element SW2, a third switching element SW3, a fourth switching element SW, a fifth switching element SW5, and a sixth switching element SW6.

The first switching element SW1 and the second switching element SW2 are connected to each other in series. The third switching element SW3 and the fourth switching element SW4 are connected to each other in series. The fifth switching element SW5 and the sixth switching element SW6 are connected to each other in series.

Additionally, the third switching element SW3 and the fourth switching element SW4 are connected to the first switching element SW1 and the second switching element SW2 in parallel. The fifth switching element SW5 and the sixth switching element SW6 are connected to the third switching element SW3 and the fourth switching element SW4 in parallel.

The inner working coil 402 connects to a connection point between the first switching element SW1 and the second witching element SW2 and connects to a connection point between the third switching element SW3 and the fourth switching element SW4. The outer working coil 404 connects to the connection point between the third switching element SW3 and the fourth switching element SW and connects to a connection point between the fifth switching element SW5 and the sixth switching element SW6.

As illustrated in FIG. 4, in the inverter circuit 204 of the induction heating apparatus 1, the third switching element SW3 and the fourth switching element SW4 connect to the outer working coil 404 as well as the inner working coil 402. In other words, the inner working coil 402 and the outer working coil 404 share the third switching element SW3 and the fourth switching element SW4.

The first switching element SW1 and the second switching element SW2 may be referred to as a first arm (or first arm circuit), and the fifth switching element SW5 and the sixth switching element SW6 may be referred to as a second arm (or second arm circuit). The third switching element SW3 and the fourth switching element SW4 may be referred to as a shared arm (or shared arm circuit).

In one embodiment, the first switching element SW1 and the second switching element SW2 are alternately turned on and turned off, the third switching element SW3 and the fourth switching element SW4 are alternately turned on and turned off, and the fifth switching element SW5 and the sixth switching element SW6 are alternately turned on and turned off.

As a result of the turn-on and turn-off operations (i.e., the switching operations) of the switching elements SW1, SW2, SW3, SW4, SW5, SW6, the DC link voltage input to the inverter circuit 204 is converted into AC current. The AC current converted by the inverter circuit 204 is supplied respectively to the inner working coil 402 and/or the outer working coil 404. As resonance occurs in the inner working coil 402 and/or the outer working coil 404 as a result of the supply of AC current, eddy current flows in a container, and the container is heated.

Additionally, a first container detecting circuit 52 and a second container detecting circuit 54 respectively connect to the inner working coil 402 and the outer working coil 404. As described below, sensing current is supplied respectively to the inner working coil 402 and the outer working coil 404 from the container detecting circuit(s) 52, 54 under control of the controller 2 in order to detect a container.

The controller 2 outputs a control signal for controlling the driving circuit 22. The driving circuit 22 supplies a switching signal S1, S2, S3, S4, S5, S6 to each of the switching elements SW1, SW2, SW3, SW4, SW5, SW6 included in the inverter circuit 204, based on the control signal supplied from the controller 2. In this disclosure, a first switching signal S1, a second switching signal S2, a third switching signal S3, a fourth switching signal S4, a fifth switching signal S5, and a sixth switching signal S6 are pulse width modulation signals having a predetermined duty cycle respectively. Other signals and/or types of signals may also be provided.

The width and/or the duty cycle of the switching signals S1-S6 are preferably the same. In particular, the first switching signal S1 has a number of square pulses being similar to each other.

The same applies for the other of the switching signals S2-S6. The pause between two square pulses might be a little longer than the pulse width. In certain driving situations (half or full mode), some of the switching signals might be off or continuously on.

As the AC current output from the inverter circuit 204 is supplied to the working coil(s) 402, 404, the working coil(s) 402, 404 operates. As the working coil(s) 402, 404 operates, the container placed over (or on) the working coil(s) 402, 404 is heated while eddy current flows in the container. Magnitude of heat energy supplied to the container varies depending on magnitude of power that is actually generated as a result of the operation of the working coil (i.e., the actual output power value of the working coil).

As the user turns on (or powers on) the induction heating apparatus 1 through the manipulation zone 130, the induction heating apparatus 1 is on standby for driving as power is supplied from the external power supply device 20 to the induction heating apparatus 1. The user may then input an instruction to initiate heating by placing (or providing) a container in the heating zone 14 and setting a power level of the heating zone 14. As the user inputs the instruction to initiate heating, the controller 2 determines a required power value corresponding to the power level set by the user.

Having received the instruction to initiate heating, the controller 2 determines a frequency (i.e., a heating frequency) corresponding to the required power value of the working coil(s) 402, 404, and supplies a control signal corresponding to the determined heating frequency to the driving circuit 22. Accordingly, a switching signal(s) S1, S2, S3, S4, S5, S6 is output from the driving circuit 22, and as the switching signal(s) S1, S2, S3, S4, S5, S6 is input respectively to each of the switching elements SW1, SW2, SW3, SW4, SW5, SW6, the working coil(s) 402, 404 operates. As the working coil 402, 404 operates, eddy current flows in the container, and the container is heated.

In one embodiment, the controller 2 determines a heating frequency that is a frequency corresponding to the power level set by the user. For example, as the user sets a power level of a heating zone, the controller 2 may gradually decrease a driving frequency of the inverter circuit 204 until the output power value of the working coil(s) 402, 404 matches the required power value corresponding to the power level set by the user, in a state in which the driving frequency of the inverter circuit 204 is set to a predetermined reference frequency. The controller 2 may determine a frequency at a time when the output power value of the working coil(s) 402, 404 matches the required power value as the heating frequency.

The controller 2 provides, to the driving circuit 22, a control signal corresponding to the determined heating frequency. The driving circuit 22 outputs a switching signal S1, S2, S3, S4, S5, S6 having a duty ratio corresponding to the heating frequency determined by the controller 2, based on the control signal output from the controller 2. As the switching signal S1, S2, S3, S4, S5, S6 is input, AC current is supplied to the working coil(s) 402, 404 while each of the switching elements SW1, SW2, SW3, SW4, SW5, SW6 is alternately turned on and turned off. Thus, the container in the heating zone 14 is heated.

In one embodiment, the controller 2 may control the driving of the inner working coil 402 and the outer working coil 404, based on the size of the container in the heating zone 14 and the power level of the heating zone 14. Examples may be provided of the controller to control the driving of the inner working coil 402 and the outer working coil 404 based on the size of the container in the heating zone 14 and the power level of the heating zone 14.

As the user sets a power level of the heating zone 14 and inputs an instruction to initiate heating, the controller 2 determines a required power value corresponding to the power level set by the user. For example, in the case of a power level of 2, the required power value may be set to 600 W, and in the case of a power level of 9, the required power value may be set to 3000 W.

As the required power value is determined, the controller 2 detects a container using the inner working coil 402 and the outer working coil 404. In one embodiment, the controller 2 may determine whether a container is over the inner working coil 402 by using the first container detecting circuit 52, and the controller 2 may determine whether a container is over the outer working coil 404 by using the second container detecting circuit 54.

Figure 5:
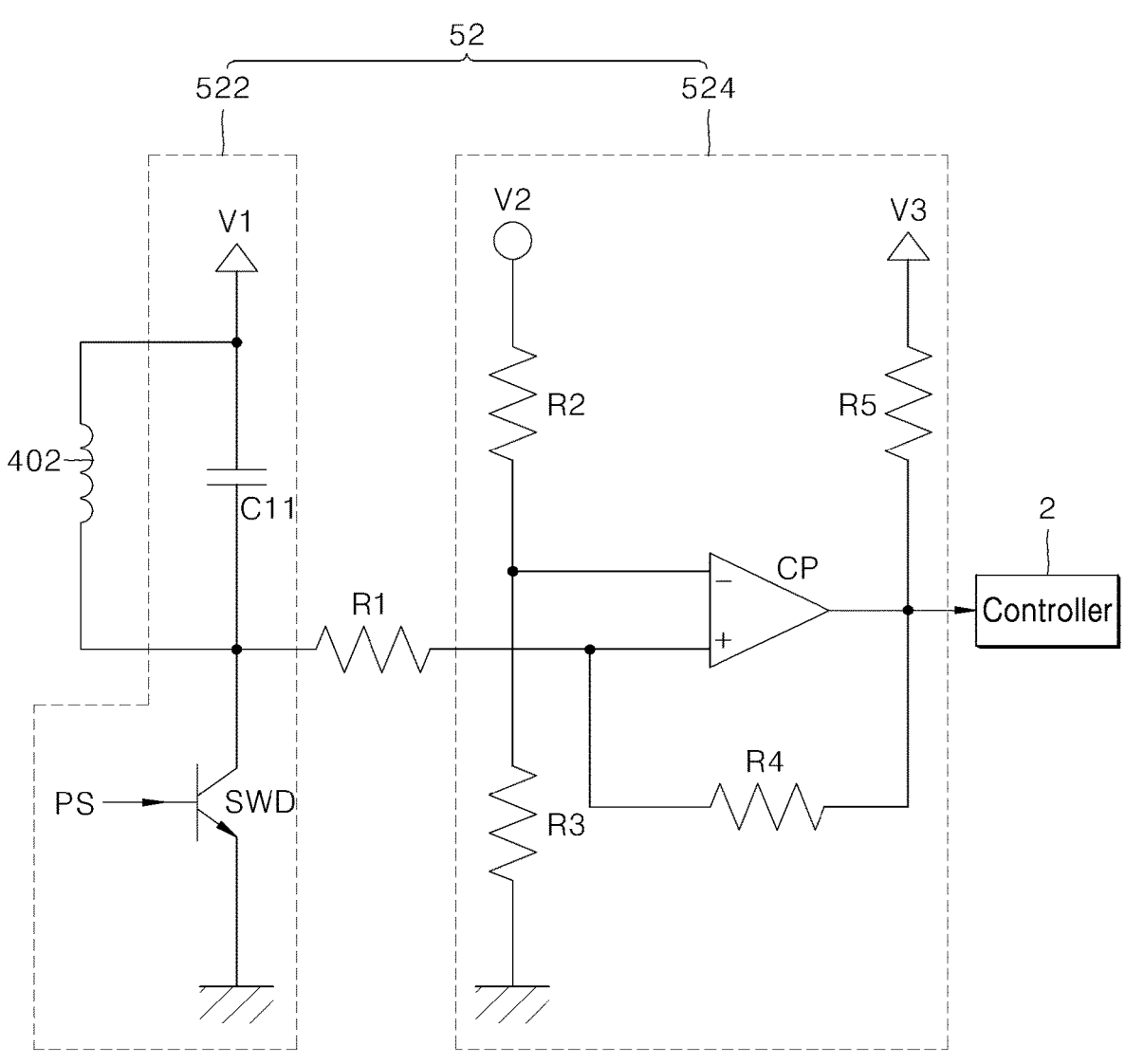
FIG. 5 is a circuit diagram showing a container detecting circuit of the induction heating apparatus of one embodiment.

FIG. 5 is a circuit diagram showing a container detecting circuit of the induction heating apparatus of one embodiment. FIG. 5 shows a circuit diagram of the first container detecting circuit 52. Although not shown, the second container detecting circuit 54, a third container detecting circuit 56, and a fourth container detecting circuit 58 may be implemented as shown in the circuit diagram of FIG. 5. The first container detecting circuit 52 of one embodiment includes a resonance signal generating circuit 522, and a resonance signal converting circuit 524.

The resonance signal generating circuit 522 includes a capacitor C11 that is connected in parallel to the inner working coil 402. The inner working coil 402 and the capacitor C11 connect between a first power supply V1 for supplying current to the inner working coil 402 and the capacitor C11 and an earth terminal (i.e., ground).

Additionally, a switching element SWD connects between the inner working coil 402 and the capacitor C11, and the earth terminal (i.e., ground). As a container starts to be detected with the inner working coil 402, the switching element SWD is turned on by a switching signal PS, and current having a predetermined amplitude and a predetermined status flows through the inner working coil 402 and the capacitor C11. During the detection of the container, current is instantly supplied to the inner working coil 402 and the capacitor C11 for a very short period of time (e.g., 0.1 second or less).

As current flows in the inner working coil 402 and the capacitor C11, based on the power supplied by the first power supply V1, as a result of the switching operation of the switching element SWD, the inner working coil 402 and the capacitor C11 bring about autonomous resonance (LC resonance). As the resonance occurs, a resonance signal that decays with time may be generated, and the generated resonance signal is input to a comparator CP included in the resonance signal converting circuit 524.

The resonance signal converting circuit 524 compares a resonance signal generated by the resonance signal generating circuit 522 with a reference signal and generates a square wave (which may be a waveform having a plurality of square waves). The resonance signal converting circuit 524 includes a comparator CP that compares a resonance signal generated by the resonance signal generating circuit 522 with a reference signal generated by a second power supply V2, and outputs results of the comparison.

More specifically, the comparator CP compares magnitude of voltage of the reference signal generated by the second power supply V2 with magnitude of voltage of the resonance signal generated by the resonance signal generating circuit 522. Based on results of the comparison, the comparator CP outputs an output signal (such as a square wave or a waveform having a square cycle) having different levels of magnitude of voltage. For example, when the magnitude of the voltage of the resonance signal generated by the resonance signal generating circuit 522 is the magnitude of the voltage of the reference signal or greater, the comparator CP may output a signal having a first level (e.g., 5 V) of magnitude of voltage, and when the magnitude of the voltage of the resonance signal is less than the magnitude of the voltage of the reference signal, the comparator CP may output a signal having a second level (e.g., 0 V) of magnitude of voltage.

In this example, the magnitude of the voltage of the reference signal generated by the second power supply V2 may be set differently by adjusting in magnitude of voltage division resistance R2, R3.

The controller 2 counts a number of waveforms of the square wave output from the resonance signal converting circuit 524, and based on the number of the counted waveforms of the square wave, to determine whether a container is in a heating zone corresponding to the inner working coil 402. The number of waveforms may be a number of cycles of squares in a waveform. In the disclosure, the number of waveforms of a square wave output from the resonance signal converting circuit 524 is referred to as a 'sensing value'.

Hereafter, when an available container is not around a working coil and is around/placed over the working coil, patterns of a resonance signal generated by the resonance signal generating circuit 522 and patterns of a square wave output by the resonance signal converting circuit 524 are described with reference to FIGS. 6 to 9.

Figure 6:
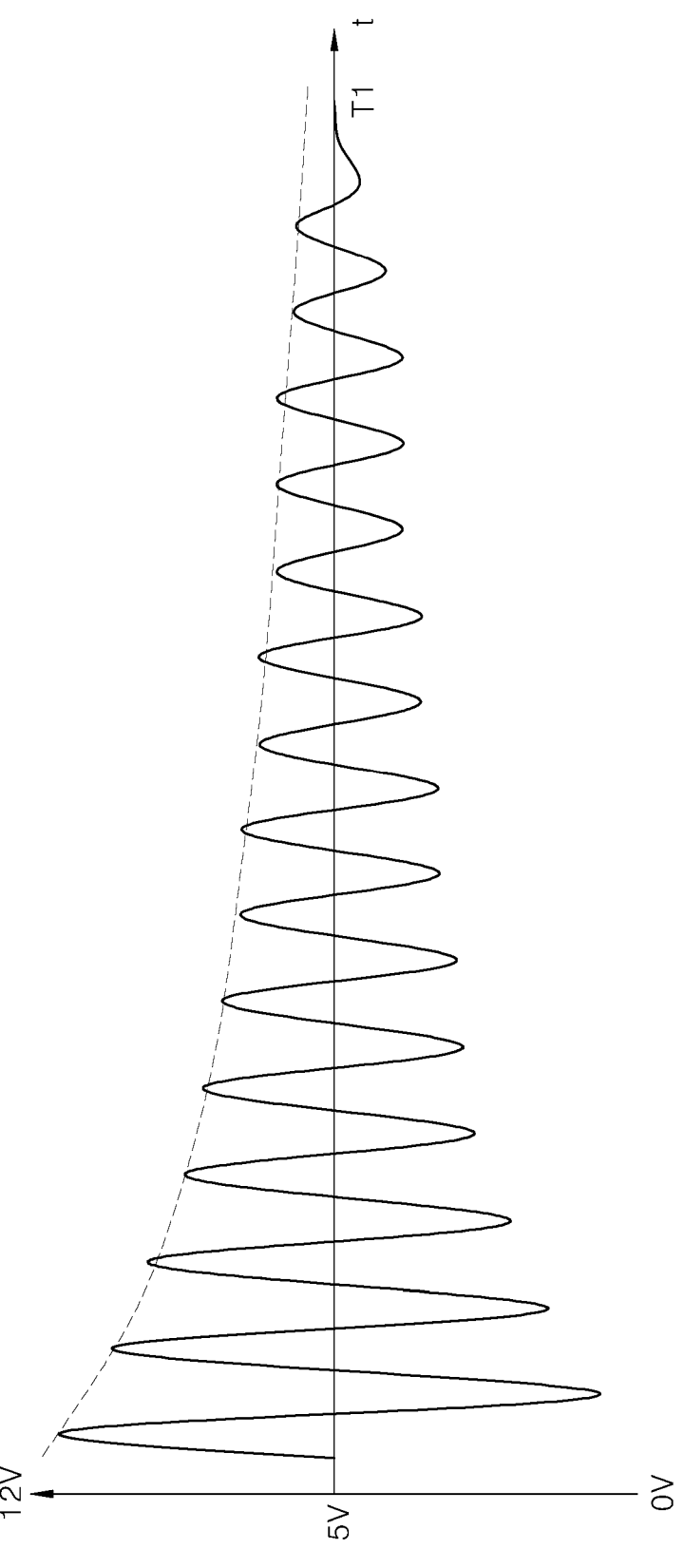
FIG. 6 is a view showing the waveform of a resonance signal that is output by a resonance signal generating circuit when a container is not in a heating zone, in one embodiment.
Figure 7:
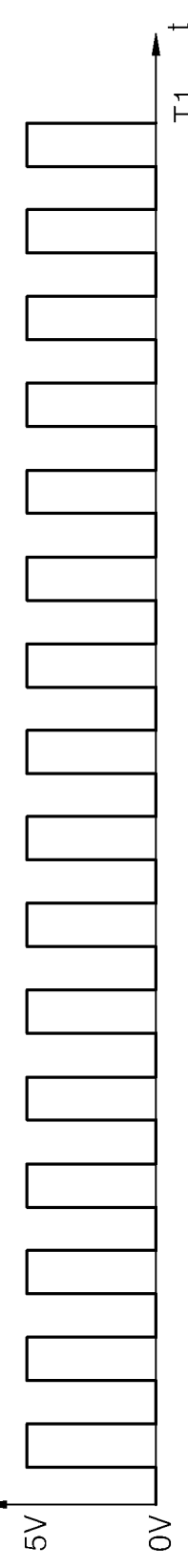
FIG. 7 is a view showing the waveform of a square wave that is output when a resonance signal converting circuit converts the resonance signal shown in FIG. 6.

FIG. 6 is a view showing the waveform of a resonance signal that is output by a resonance signal generating circuit when a container is not in a heating zone, in one embodiment. FIG. 7 is a view showing the waveform of a square wave that is output when a resonance signal converting circuit converts the resonance signal illustrated in FIG. 6.

Referring to FIG. 6, as the controller 2 initiates detection of a container in a state in which an available container is not around the inner working coil 402, the switching element SWD is turned on, and current having a predetermined amplitude and a predetermined magnitude is supplied to the inner working coil 402 and the capacitor C11. As the current is supplied, the inner working coil 402 and the capacitor C11 autonomously resonate. Accordingly, a resonance signal generating circuit 522 outputs a resonance signal that decays with time, as illustrated in FIG. 6.

When an available container does not exist around the inner working coil 402, the impedance of the inner working coil 402 and the capacitor C11 circuit is maintained lower than when an available container exists around the inner working coil 402. Thus, the resonance signal output by the resonance signal generating circuit 522 is reduced for a relatively long period of time, and then disappears at time T1, as illustrated in FIG. 6.

Having received a resonance signal the same as that of FIG. 6, the comparator CP of the resonance signal converting circuit 524 compares magnitude of voltage of the input resonance signal with magnitude (e.g., 5 V) of voltage of the reference signal. Accordingly, the comparator CP outputs a signal of a first level (e.g., 5 V) only when the magnitude of the voltage of the resonance signal is the magnitude of the voltage of the reference signal or greater. When the magnitude of the voltage of the resonance signal is not the magnitude of the voltage of the reference signal or greater, the comparator CP outputs a signal of a second level (e.g., 0 V). The signal output from the comparator CP has waveforms of a square wave the same as that of FIG. 7. In the embodiment of FIG. 7, a total of 16 square waves is generated from the time point at which a first container detecting operation starts to time point T1.

Figure 8:
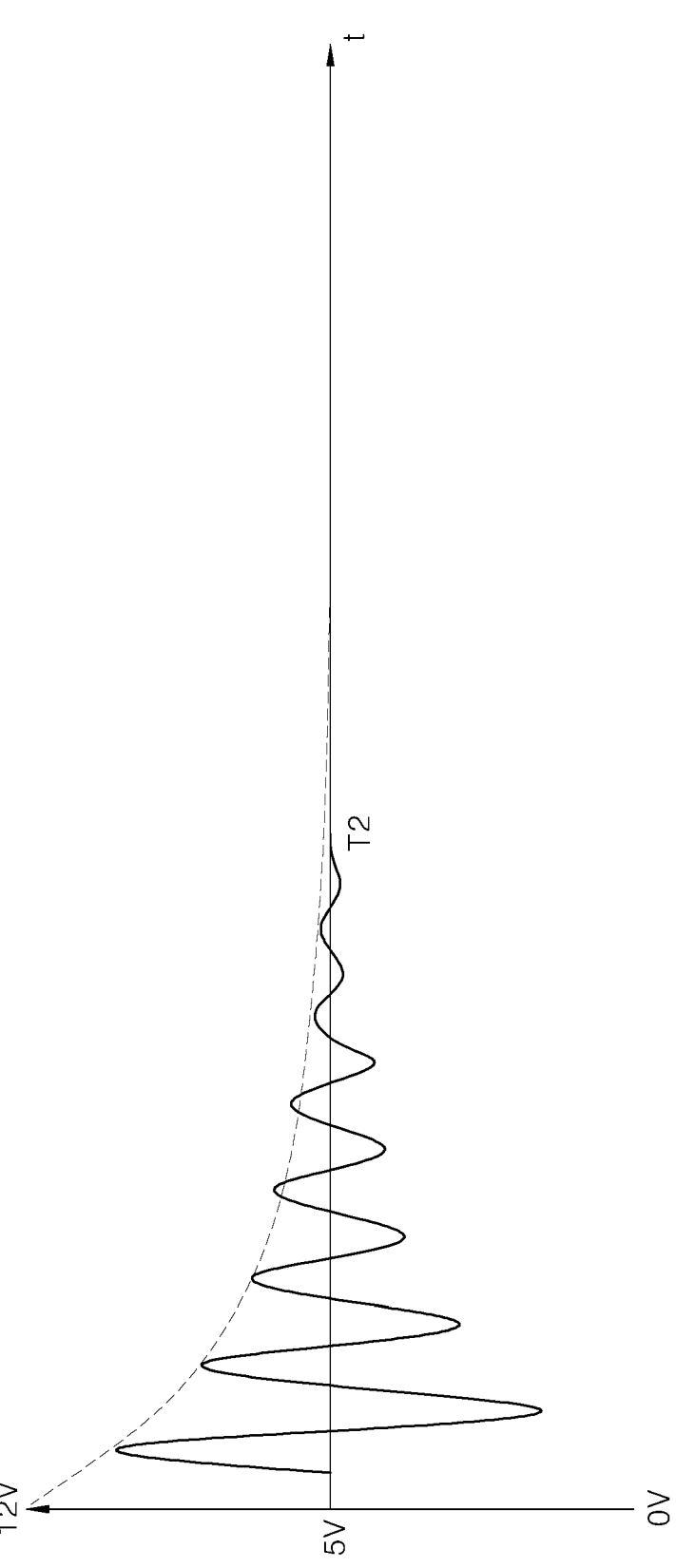
FIG. 8 is a view showing the waveform of a resonance signal that is output by the resonance signal generating circuit when a container is in a heating zone.
Figure 9:
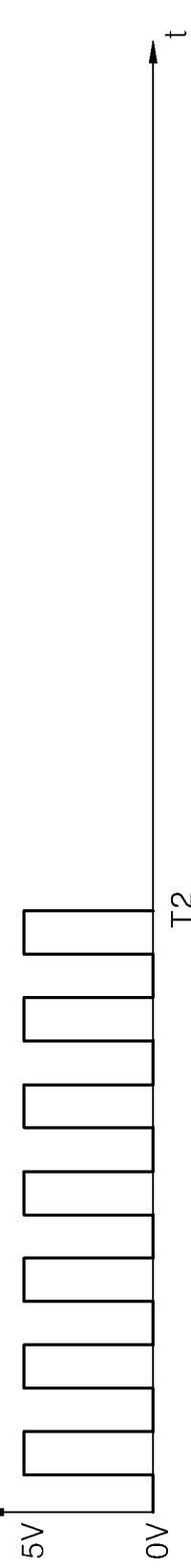
FIG. 9 is a view showing the waveform of a square wave that is output when the resonance signal converting circuit converts the resonance signal shown in FIG. 8.

FIG. 8 is a view showing the waveform of a resonance signal that is output by the resonance signal generating circuit when a container is in a heating zone, in one embodiment. FIG. 9 is a view showing the waveform of a square wave that is output when the resonance signal converting circuit converts the resonance signal illustrated in FIG. 8.

Referring to FIG. 8, as the first container detecting operation starts in a state in which an available container is around/placed over the inner working coil 402, the switching element SWD is turned on, and current having a predetermined amplitude and a predetermined magnitude is supplied to the inner working coil 402 and the capacitor C11. As the current is supplied, the inner working coil 402 and the capacitor C11 autonomously resonate. Accordingly, the resonance signal generating circuit 522 outputs a resonance signal that that decays with time, as illustrated in FIG. 8.

When an available container is around/placed over the inner working coil 402, the impedance of the inner working coil 402 and the capacitor C11 circuit are higher than when an available container is not around the inner working coil 402. Thus, the resonance signal output by the resonance signal generating circuit 522 is reduced for a shorter period of time than the embodiment of FIG. 6, and then disappears at time T2, as illustrated in FIG. 8.

Having received a resonance signal the same as that of FIG. 8, the comparator CP of the resonance signal converting circuit 524 compares magnitude of voltage of the input resonance signal with magnitude (e.g., 5 V) of voltage of the reference signal. Accordingly, the comparator CP outputs a signal of a first level (e.g., 5 V) only when the magnitude of the voltage of the resonance signal is the magnitude of the voltage of the reference signal or greater. When the magnitude of the voltage of the resonance signal is not the magnitude of the voltage of the reference signal or greater, the comparator CP outputs a signal of a second level (e.g., 0 V). The signal output from the comparator CP has waveforms of a square wave the same as that of FIG. 9. In the embodiment of FIG. 9, a total of 7 square waves is generated from the time point at which the first container detecting operation starts to time point T2.

As described with reference to FIGS. 6 to 9, when an available container is not in a heating zone, the number of waveforms of a square wave output by the resonance signal converting circuit 524 (i.e., a sensing value) is greater than the number of waveforms of a square wave output by the resonance signal converting circuit 524 when an available container is in a heating zone.

Thus, the controller 2 may perform detection of a container, which involves determining whether a container is in a heating zone corresponding to the inner working coil 402 based on the number of waveforms of a square wave output from the first container detecting circuit 52 (i.e., a sensing value). For example, the controller 2 may determine a container is in the heating zone corresponding to the inner working coil 402 when the counted number of waveforms of a square wave (i.e., a sensing value) is a predetermined reference value or less, and when the sensing value is greater than the predetermined reference value, the controller may determine that a container is not in the heating zone corresponding to the inner working coil 402.

Though not illustrated, the configuration of the second container detecting circuit 54 is substantially the same as that of the first container detecting circuit 52 illustrated in FIG. 5. Additionally, a method in which a container is detected using the second container detecting circuit 54 and the outer working coil 404 is the same as the above-described method in which a container is detected using the first container detecting circuit 52 and the inner working coil 402.

Using the above-described method, the controller 2 determines whether a container is over the inner working coil 402 and then determines whether a container is over the outer working coil 404.

In one embodiment, when it is determined that a container exists during detection of a container only with the inner working coil 402, the controller 2 determines the inner working coil 402 as the working coil to be driven. In one embodiment, when it is determined that a container exists during detection of a container only with the outer working coil 404, the controller 2 determines the outer working coil 404 as the working coil to be driven. In one embodiment, when it is determined that a container exists during detection of a container with the inner working coil 402 and that a container exists during detection of a container with the outer working coil 404, the controller 2 determines the inner working coil 402 and the outer working coil 404 as the working coils to be driven.

Having determined the working coil to be driven, the controller 2 determines a driving mode of the working coil to be driven, based on the type of the working coil to be driven and the required power value previously determined.

In one embodiment, the controller 2 determines a half bridge mode as the driving mode of the working coil to be driven when the required power value is a predetermined reference power value or less. In one embodiment, the controller 2 determines a full bridge mode as the driving mode of the working coil to be driven when the required power value is greater than the reference power value.

Figure 10:
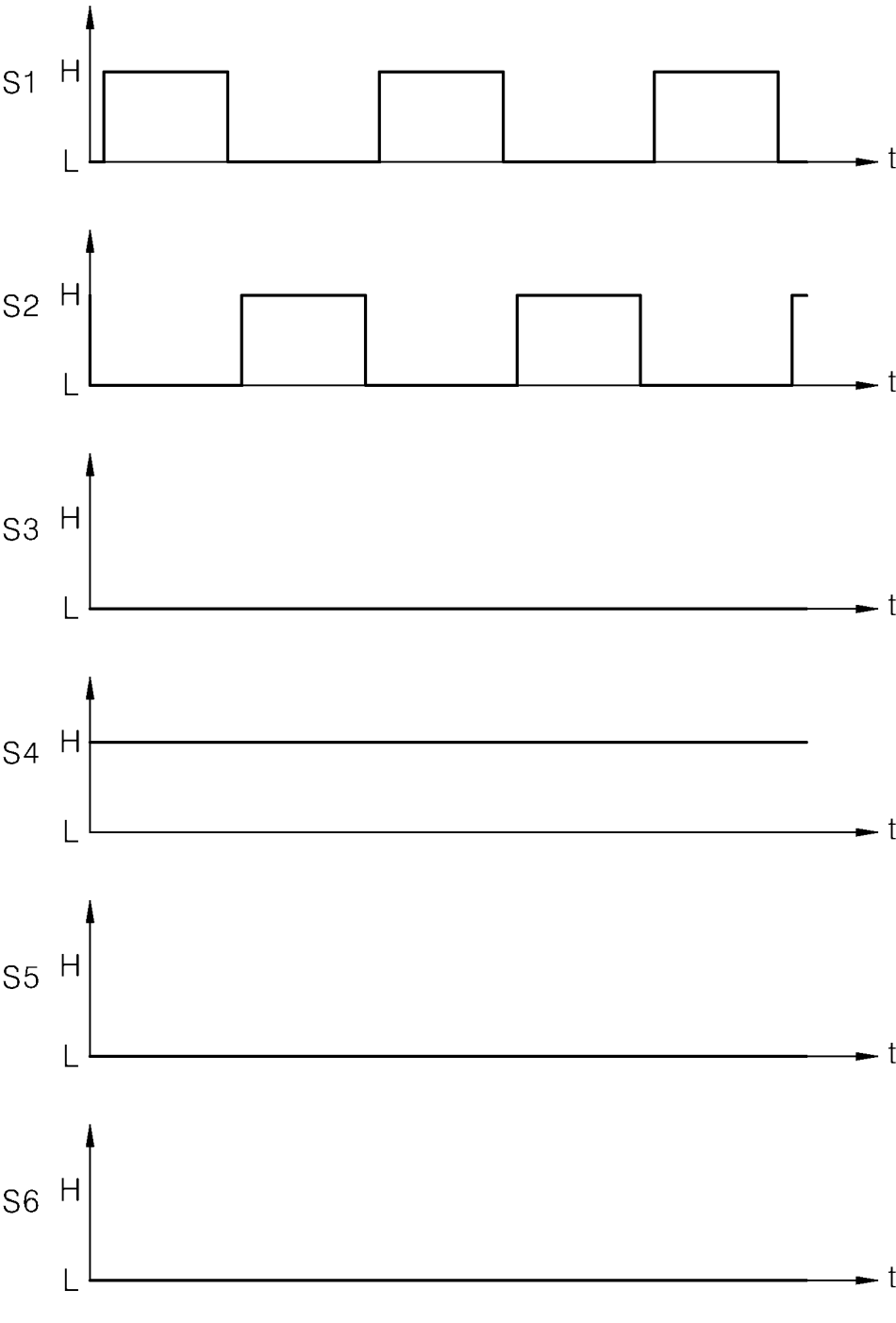
FIG. 10 is a view showing the waveforms of switching signals input to an inverter circuit when a working coil to be driven is an inner working coil and when a driving mode of the working coil to be driven is a half bridge mode.

FIG. 10 is a view showing the waveforms of switching signals input to an inverter circuit when a working coil to be driven is an inner working coil and when a driving mode of the working coil to be driven is a half bridge mode, in one embodiment.

When the inner working coil 402 is determined as the working coil to be driven and when a required power value corresponding to a power level of the heating zone 14 is the predetermined reference power value (e.g., 600 W) or less, as a result of the above-described detection of the container, the controller 2 determines the half bridge mode as the driving mode of the working coil to be driven. Accordingly, the controller 2 supplies a control signal to the driving circuit 22 to output switching signals S1, S2, S3, S4, S5, S6 having waveforms as shown in FIG. 10.

Referring to FIG. 10, when the working coil to be driven is the inner working coil 402 and when the driving mode is the half bridge mode, the first switching element SW1 and the second switching element SW2 are alternately turned on and turned off. Additionally, the fourth switching element SW4 is maintained on, and the third switching element SW3, the fifth switching element SW5 and the sixth switching element SW6 are maintained off respectively.

Figure 11:
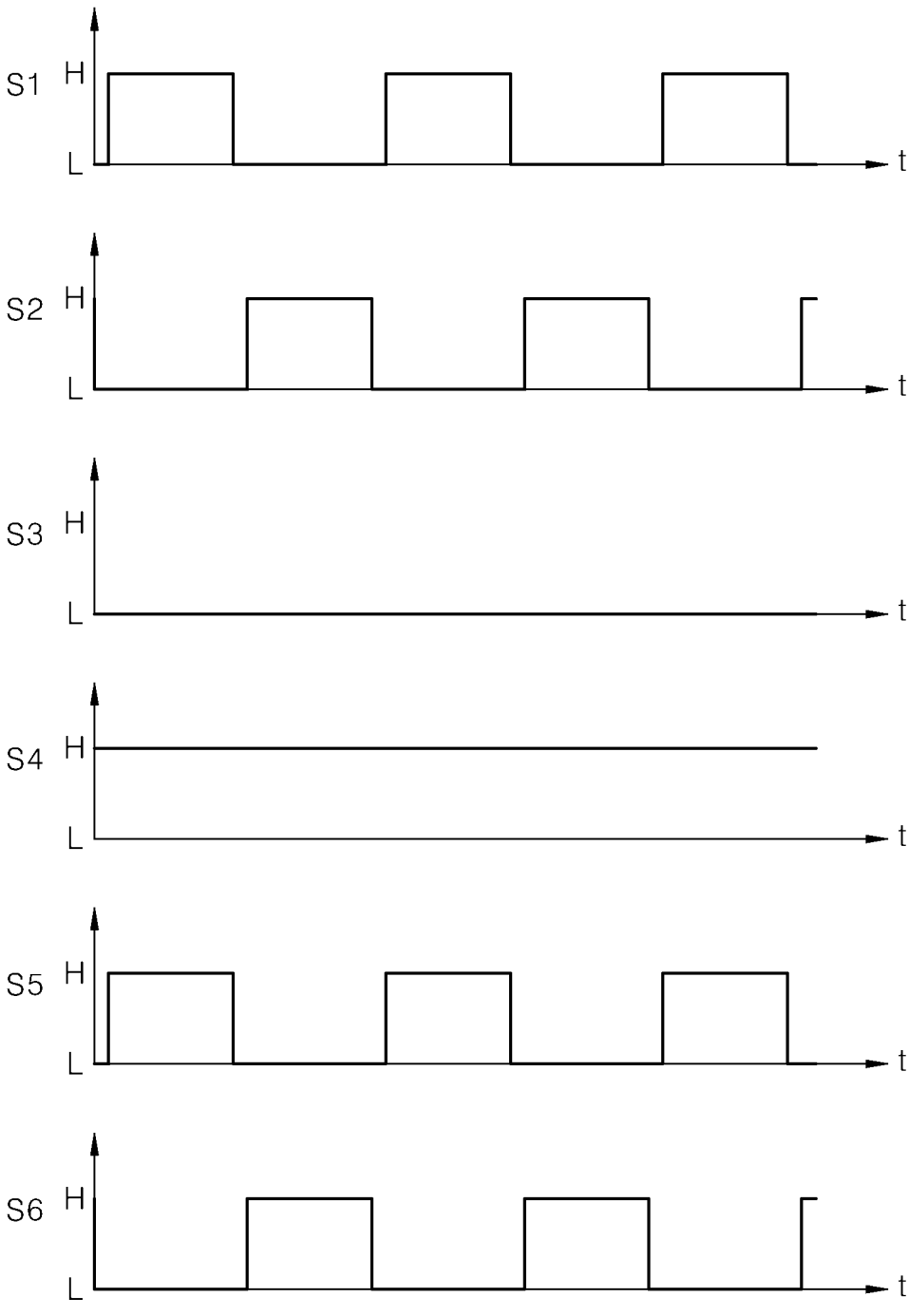
FIG. 11 is a view showing the waveforms of switching signals input to the inverter circuit when a working coil to be driven is an inner working coil and an outer working coil and when a driving mode of the working coil to be driven is a half bridge mode.

FIG. 11 is a view showing the waveforms of switching signals input to the inverter circuit when a working coil to be driven is an inner working coil and an outer working coil and when a driving mode of the working coil to be driven is a half bridge mode, in one embodiment.

When the inner working coil 402 and the outer working coil 404 are determined as the working coil to be driven and when a required power value corresponding to a power level of the heating zone 14 is the predetermined reference power value (e.g., 600 W) or less, as a result of the above-described detection of the container, the controller 2 determines the half bridge mode as the driving mode of the working coil to be driven. Accordingly, the controller 2 supplies a control signal to the driving circuit 22 to output the switching signals S1, S2, S3, S4, S5, S6 having waveforms as shown in FIG. 11.

Referring to FIG. 11, when the working coil to be driven is the inner working coil 402 and the outer working coil 404 and when the driving mode is the half bridge mode, the first switching element SW1 and the second switching element SW2 are alternately turned on and turned off, and the fifth switching element SW5 and the sixth switching element SW6 are alternately turned on and turned off. Additionally, the fourth switching element SW4 is maintained on, and the third switching element SW3 is maintained off.

Figure 12:
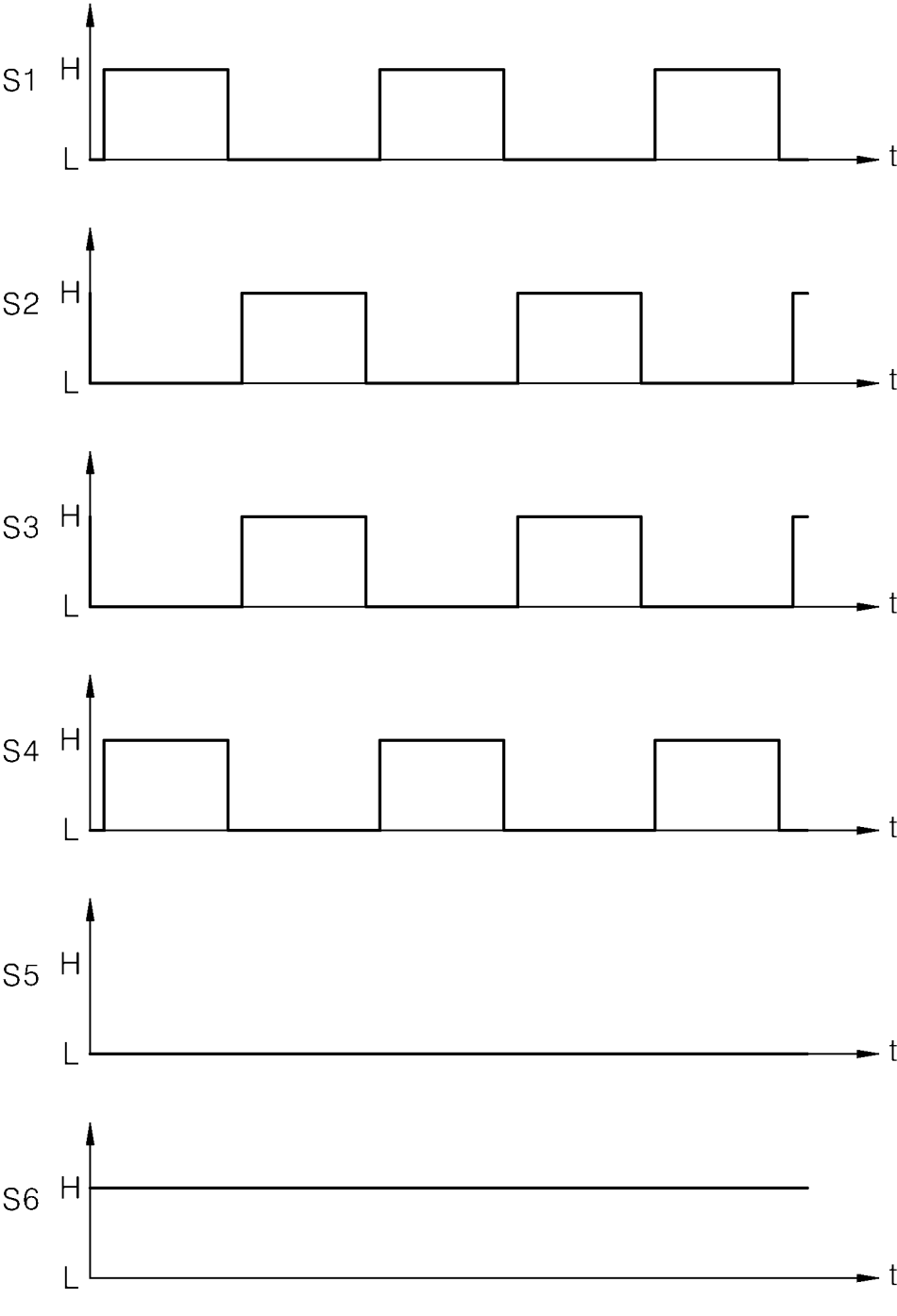
FIG. 12 is a view showing the waveforms of switching signals input to the inverter circuit when a working coil to be driven is an inner working coil and when a driving mode of the working coil to be driven is a full bridge mode.

FIG. 12 is a view showing the waveforms of switching signals input to the inverter circuit when a working coil to be driven is an inner working coil and when a driving mode of the working coil to be driven is a full bridge mode, in one embodiment.

When the inner working coil 402 is determined as the working coil to be driven and when a required power value corresponding to a power level of the heating zone 14 is greater than the predetermined reference power value (e.g., 600 W), as a result of the above-described detection of the container, the controller 2 determines the full bridge mode as the driving mode of the working coil to be driven. Accordingly, the controller 2 supplies a control signal to the driving circuit 22 to output switching signals S1, S2, S3, S4, S5, S6 having waveforms as shown in FIG. 12.

Referring to FIG. 12, when the working coil to be driven is the inner working coil 402 and when the driving mode is the full bridge mode, the first switching element SW1 and the second switching element SW2 are alternately turned on and turned off, and the third switching element SW3 and the fourth switching element SW4 are alternately turned on and turned off. Additionally, the first switching element SW1 and the fourth switching element SW4 are turned on and turned off on the same timing, and the second switching element SW2 and the third switching element SW3 are turned on and turned off on the same timing. Additionally, the fifth switching element SW5 and the sixth switching element SW6 are maintained on.

Figure 13:
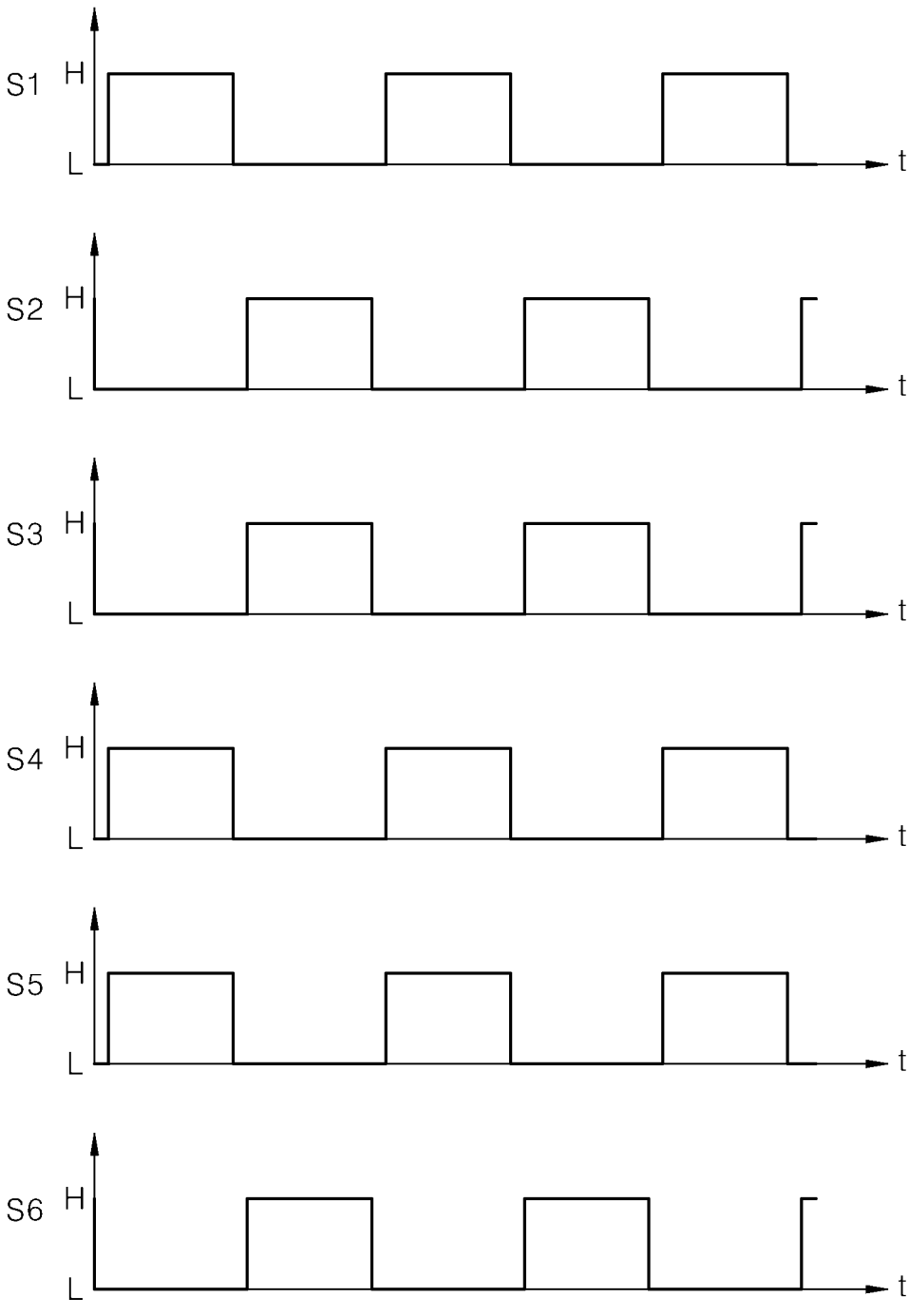
FIG. 13 is a view showing the waveforms of switching signals input to the inverter circuit when a working coil to be driven is an inner working coil and an outer working coil and when a driving mode of the working coil to be driven is a full bridge mode.

FIG. 13 is a view showing the waveforms of switching signals input to the inverter circuit when a working coil to be driven is an inner working coil and an outer working coil and when a driving mode of the working coil to be driven is a full bridge mode, in one embodiment.

When the inner working coil 402 and the outer working coil 404 are determined as the working coil to be driven and when a required power value corresponding to a power level of the heating zone 14 is greater than the predetermined reference power value (e.g., 600 W), as a result of the above-described detection of the container, the controller 2 determines the full bridge mode as the driving mode of the working coil to be driven. Accordingly, the controller 2 supplies a control signal to the driving circuit 22 to output switching signals S1, S2, S3, S4, S5, S6 having waveforms as shown in FIG. 13.

Referring to FIG. 13, when the working coil to be driven is the inner working coil 402 and the outer working coil 404 and when the driving mode is the full bridge mode, the first switching element SW1 and the second switching element SW2 are alternately turned on and turned off, the third switching element SW3 and the fourth switching element SW4 are alternately turned on and turned off, and the fifth switching element SW5 and the sixth switching element SW6 are alternately turned on and turned off. Additionally, the first switching element SW1, the fourth switching element SW4 and the fifth switching element SW5 are turned on and turned off on the same timing, and the second switching element SW2, the third switching element SW3, and the sixth switching element SW6 are turned on and turned off on the same timing.

In the method for controlling the induction heating apparatus of one embodiment, described with reference to FIGS. 10 to 13, the size of a container is sensed based on the detection of the container, performed through the container detecting circuit, and depending on the size of the container, a working coil to be driven is determined. That is, in one embodiment, the size of a container may be determined accurately and rapidly without a physical sensor such as an infrared distance sensor or an ultrasonic distance sensor. Since the working coil to be driven is determined depending on the size of the container, unnecessary consumption of electric power, caused during the driving of the induction heating apparatus, may decrease.

In the induction heating apparatus of one embodiment, the driving modes of the two working coils may change to the half bridge mode or the full bridge mode respectively. A maximum output power value of the working coil when the working coil operates in the full bridge mode is greater than when the working coil operates in the half bridge mode. Accordingly, when a relatively low output is required, the working coil operates in the half bridge mode, and when a relatively high output is required, the working coil operates in the full bridge mode. Thus, electric power efficiency of the induction heating apparatus may improve.

In other disadvantageous arrangements, for two working coils to operate in the full bridge mode respectively, each of the working coils may need four switching elements. Accordingly, a total of eight switching elements are needed. However, in one embodiment of the present disclosure, the two working coils may operate in the full bridge mode through the inverter circuit including only six switching elements. Since the number of switching elements decreases, unlike the disadvantageous arrangements, the induction heating apparatus according to the disclosure ensures a reduction in its manufacturing costs and the possibility of its failure.

Figure 14:
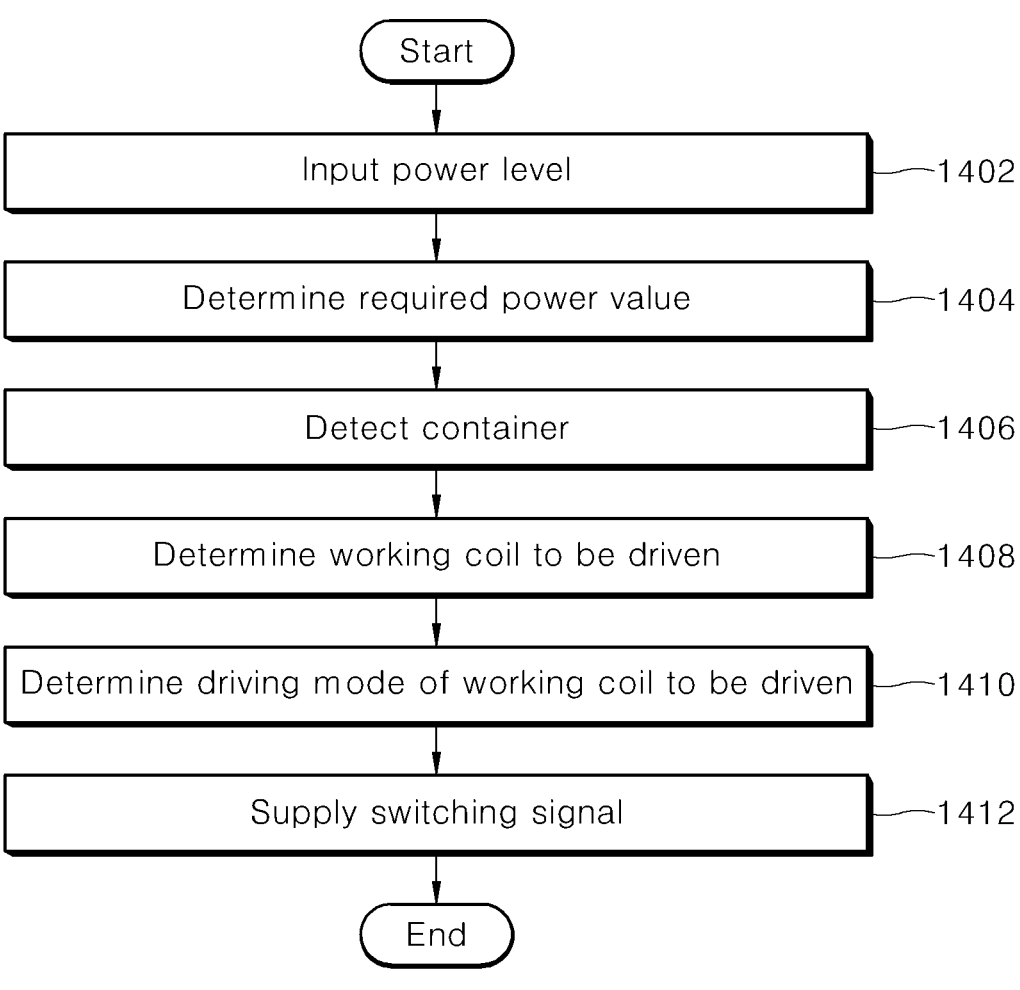
FIG. 14 is a flow chart showing a method of controlling the induction heating apparatus of one embodiment.

FIG. 14 is a flow chart showing a method of controlling the induction heating apparatus of one embodiment.

Referring to FIG. 14, the controller of the induction heating apparatus 1 of one embodiment receives a power level of the heating zone 14, input through the manipulation zone 130 (1402).

As the power level is input, the controller 2 determines a required power value of the heating zone 14, corresponding to the power level (1404).

Then the controller 2 detects a container by using the inner working coil 402 and the outer working coil 404 (1406). The controller 2 determines a working coil to be driven out of the inner working coil 402 and the outer working coil 404, based on results of the detection of the container (1408).

In one embodiment, determining a working coil to be driven (1406) includes determining the inner working coil 402 as the working coil to be driven when the controller determines that a container exists during detection of a container only with the inner working coil 402. Additionally, in one embodiment, determining a working coil to be driven (1406) includes determining the outer working coil 404 as the working coil to be driven when the controller determines that a container exists during detection of a container only with the outer working coil 404. Further, in one embodiment, determining a working coil to be driven (1406) includes determining the inner working coil 402 and the outer working coil 404 as the working coil to be driven when the controller determines that a container exists during detection of a container with the inner working coil 402 and that a container exists during detection of a container with the outer working coil 404.

Then the controller 2 determines a driving mode of the working coil to be driven (1410).

In one embodiment, determining a driving mode of the working coil to be driven (1410) includes determining the driving mode of the working coil to be driven as a half bridge mode when the required power value is a predetermined reference power value or less. Additionally, in one embodiment, determining a driving mode of the working coil to be driven (1410) includes determining the driving mode of the working coil to be driven as a full bridge mode when the required power value is greater than the reference power value.

As the controller determines the working coil to be driven and the driving mode of the working coil to be driven, the controller 2 supplies a control signal to the driving circuit 22, based on the working coil to be driven and the driving mode of the working coil to be driven. Accordingly, a switching signal is supplied from the driving circuit 22 to the inverter circuit 204. The driving circuit 22 supplies any one of the switching signals illustrated in FIGS. 10 to 13, based on the working coil to be driven and the driving mode of the working coil to be driven.

The embodiments are described above with reference to a number of illustrative embodiments thereof. However, embodiments are not limited to the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

One objective of the present disclosure is to provide an induction heating apparatus and a method for controlling the same that improves a detection of a container and in particular the size of a container or the position of the container without a physical sensor such that a working coil may be operated in a variable manner depending on the existence, size and/or position of the container.

Another objective of the present disclosure is to provide an induction heating apparatus and a method for controlling the same that may vary the output power value of a working coil depending on the size of a container or a power level of a heating zone.

An induction heating apparatus of one embodiment includes an inner working coil disposed in a position corresponding to a heating zone, an outer working coil sharing a center with the inner working coil and disposed in a way that surrounds the inner working coil, an inverter circuit supplying current for driving to at least one of the inner working coil and the outer working coil and including a plurality of switching elements, a driving circuit supplying a switching signal to each of the switching elements, and a controller supplying a control signal for outputting the switching signal to the driving circuit.

In another aspect an induction heating apparatus is provided including an inner working coil disposed in a position corresponding to a heating zone, an outer working coil sharing a center with the inner working coil and disposed in a way that surrounds the inner working coil, an inverter circuit for driving to at least one of the inner working coil and the outer working coil and including a plurality of switching elements, a driving circuit supplying a switching signal to the switching elements, and a controller supplying a control signal for outputting the switching signal to the driving circuit.

In one embodiment, the controller determines a required power value of the heating zone based on a power level set for the heating zone, detects a container by using the inner working coil and the outer working coil, determines a working coil to be driven based on results of the detection of the container, determines a driving mode of the working coil to be driven based on the required power value, and supplies a control signal based on the driving mode.

Thus, first a requested power value is determined, based thereon it is checked whether and in case of multiple working coils, where a container is played in the heating zone and only if a container is detected, the corresponding power level is applied to working coil on which a container is detected.

In one embodiment, the controller determines the inner working coil as the working coil to be driven when it is determined that a container exists during detection of a container only with the inner working coil, determines the outer working coil as the working coil to be driven when it is determined that a container exists during detection of a container only with the outer working coil, and determines the inner working coil and the outer working coil as the working coil to be driven when it is determined that a container exists during detection of a container with the inner working coil and that a container exists during detection of a container with the outer working coil.

In one embodiment, the controller determines the driving mode of the working coil to be driven as a half bridge mode when the required power value is a predetermined reference power value or less, and determines the driving mode of the working coil to be driven as a full bridge mode when the required power value is greater than the reference power value.

In one embodiment, the inverter circuit includes a first switching element and a second switching element connected to each other in series, a third switching element and a fourth switching element connected to each other in series and connected to the first switching element and the second switching element in parallel, and a fifth switching element and a sixth switching element connected to each other in series and connected to the third switching element and the fourth switching element in parallel, in which the inner working coil connects between a connection point between the first switching element and the second switching element and a connection point between the third switching element and the fourth switching element, and the outer working coil connects between the connection point between the third switching element and the fourth switching element and a connection point between the fifth switching element and the sixth switching element.

In one embodiment, the first switching element and the second switching element are alternately turned on and turned off, and the fourth switching element is kept on when a driving mode of the inner working coil is a half bridge mode, and the fifth switching element and the sixth switching element are alternately turned on and turned off, and the fourth switching element is kept on when a driving mode of the outer working coil is a half bridge mode.

In one embodiment, the first switching element and the fourth switching element are alternately turned on and off with the second switching element and the third switching element when the driving mode of the inner working coil is a full bridge mode, and the third switching element and the sixth switching element are alternately turned on and off with the fourth switching element and the fifth switching element when a driving mode of the outer working coil is a full bridge mode.

In one embodiment, the controller supplies a sensing current having a predetermined amplitude and a predetermined magnitude to the inner working coil or the outer working coil, and converts a resonance signal, which is generated when the sensing current is supplied, into a square wave, and determines whether a container exists based on the number of square waves.

In one or more embodiments, the inverter circuit or the induction heating device may further include at least one container detecting circuit being connected in parallel to the inner working coil and/or outer working coil.

The detection circuit may comprise a resonance signal generating circuit for generating a resonance signal, and a resonance signal converting circuit for generating a sensing value based on the resonance signal.

A method for controlling an induction heating apparatus of one embodiment includes receiving an input power level of a heating zone, determining a required power value of the heating zone based on the power level, detecting a container with an inner working coil and an outer working coil, determining a working coil to be driven based on results of the detection of the container, determining a driving mode of the working coil to be driven based on the required power value, and supplying a control signal for outputting a switching signal to be supplied to an inverter circuit based on the driving mode.

In one embodiment, determining a working coil to be driven based on results of the detection of the container includes determining the inner working coil as the working coil to be driven when a controller determines that a container exists during detection of a container only with the inner working coil, determining the outer working coil as the working coil to be driven when the controller determines that a container exists during detection of a container only with the outer working coil, and determining the inner working coil and the outer working coil as the working coil to be driven when the controller determines that a container exists during detection of a container with the inner working coil and that a container exists during detection of a container with the outer working coil.

In one embodiment, determining a driving mode of the working coil to be driven based on the required power value includes determining the driving mode of the working coil to be driven as a half bridge mode when the required power value is a predetermined reference power value or less, and determining the driving mode of the working coil to be driven as a full bridge mode when the required power value is greater than the reference power value.

In one embodiment, the inverter circuit includes a first switching element and a second switching element connected to each other in series, a third switching element and a fourth switching element connected to each other in series and connected to the first switching element and the second switching element in parallel, and a fifth switching element and a sixth switching element connected to each other in series and connected to the third switching element and the fourth switching element in parallel, in which the inner working coil connects between a connection point between the first switching element and the second switching element and a connection point between the third switching element and the fourth switching element, and the outer working coil connects between the connection point between the third switching element and the fourth switching element and a connection point between the fifth switching element and the sixth switching element.

In one embodiment, the first switching element and the second switching element are alternately turned on and turned off, and the fourth switching element is kept on when a driving mode of the inner working coil is a half bridge mode, and the fifth switching element and the sixth switching element are alternately turned on and turned off, and the fourth switching element is kept on when a driving mode of the outer working coil is a half bridge mode.

In one embodiment, the first switching element and the fourth switching element are alternately turned on and off with the second switching element and the third switching element when the driving mode of the inner working coil is a full bridge mode, and the third switching element and the sixth switching element are alternately turned on and off with the fourth switching element and the fifth switching element when a driving mode of the outer working coil is a full bridge mode.

In one embodiment, detecting a container with the inner working coil and the outer working coil includes supplying sensing current having a predetermined amplitude and a predetermined magnitude to the inner working coil or the outer working coil, converting a resonance signal, which is generated when the sensing current is supplied, into a square wave, and determining whether a container exists based on the number of square waves.

An induction heating apparatus in embodiments accurately may detect the size of a container without a physical sensor such that a working coil operates in a variable manner depending on the size of the container.

The induction heating apparatus in embodiments may vary the output power value of a working coil depending on the size of a container or a power level of a heating zone.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus, comprising:

an inner working coil disposed to correspond to a heating zone;

an outer working coil disposed to surround an outer surface of the inner working coil;

an inverter circuit configured to provide current for driving at least one of the inner working coil or the outer working coil, and including a plurality of switching elements;

a driving circuit configured to provide a switching signal to each of the switching elements;

a controller configured to:

determine a required power value of the heating zone, based on a power level set for the heating zone, detect a container by using the inner working coil and by using the outer working coil, determine at least one of the inner working coil or the outer working coil to be driven, based on at least one result of the detection of the container, determine a driving mode of the at least one of the inner working coil or the outer working coil to be driven as one of a half bridge mode or a full bridge mode, based on the required power value, and provide, to the driving circuit, a control signal for providing the switching signal, based on the determined driving mode, wherein the plurality of switching elements of the inverter circuit comprises:

a first switching element and a second switching element connected to each other in series;

a third switching element and a fourth switching element connected to each other in series, and connected to the first switching element and the second switching element in parallel; and a fifth switching element and a sixth switching element connected to each other in series, and connected to the third switching element and the fourth switching element in parallel, wherein the inner working coil is connected to a connection point between the first switching element and the second switching element and is connected to a connection point between the third switching element and the fourth switching element, and the outer working coil is connected to the connection point between the third switching element and the fourth switching element and is connected to a connection point between the fifth switching element and the sixth switching element, and wherein when the determined driving mode is the half bridge mode, the first switching element and the second switching element are alternately turned on and turned off, and the fourth switching element is maintained on, and when the determined driving mode is the half bridge mode, the fifth switching element and the sixth switching element are alternately turned on and turned off, and the fourth switching element is maintained on.

2. The induction heating apparatus of claim 1, wherein when the container is determined to exist during detection of the container only by using the inner working coil, the controller determines the inner working coil to be driven, when the container is determined to exist during detection of the container only by using the outer working coil, the controller determines the outer working coil to be driven, and when the container is determined to exist during detection of the container by using the inner working coil and during detection of the container by using the outer working coil, the controller determines both the inner working coil and the outer working coil to be driven.

3. The induction heating apparatus of claim 1, wherein when the required power value is a predetermined reference power value or less, the controller determines that the driving mode of the at least one of the inner working coil or the outer working coil to be driven as the half bridge mode, and when the required power value is greater than the predetermined reference power value, the controller determines that the driving mode of the at least one of the inner working coil or the outer working coil to be driven as the full bridge mode.

4. The induction heating apparatus of claim 1, wherein when the determined driving mode is the full bridge mode, the first switching element and the fourth switching element are alternately turned on and off with the second switching element and the third switching element, and when the determined driving mode is the full bridge mode, the third switching element and the sixth switching element are alternately turned on and off with the fourth switching element and the fifth switching element.

5. The induction heating apparatus of claim 1, wherein the induction heating apparatus is configured to:

provide a sensing current having a predetermined amplitude and a predetermined magnitude to the inner working coil or the outer working coil, and convert a resonance signal, provided by the sensing current, into a waveform having a cycle, and the controller is configured to:

determine whether the container exists, based on a number of the cycles of the waveform.

6. An induction heating apparatus, comprising:

an inner working coil;

an outer working coil disposed to surround an outer surface of the inner working coil, and a heating zone is to correspond to a center of the inner working coil which correspond to a center of the outer working coil;

an inverter circuit configured to provide current for driving the inner working coil and the outer working coil, and including a plurality of switching elements;

a controller configured to:

detect a container at the heating zone by using the inner working coil;

detect a container at the heating zone by using the outer working coil, determine at least one of the inner working coil or the outer working coil to be driven, based on at least one result of the detection of the container by using the inner working coil and the detection of the container by using the outer working coil, determine a driving mode of the at least one of the inner working coil or the outer working coil to be driven as one of a half bridge mode or a full bridge mode, based on a set power level, and provide switching signals to the inverter circuit, based on the determined driving mode, wherein the plurality of switching elements of the inverter circuit comprises:

a first switching element and a second switching element connected to each other in series;

a third switching element and a fourth switching element connected to each other in series, and connected to the first switching element and the second switching element in parallel; and a fifth switching element and a sixth switching element connected to each other in series, and connected to the third switching element and the fourth switching element in parallel, wherein the inner working coil is connected to a connection point between the first switching element and the second switching element and is connected to a connection point between the third switching element and the fourth switching element, and the outer working coil is connected to the connection point between the third switching element and the fourth switching element and is connected to a connection point between the fifth switching element and the sixth switching element, and wherein when the determined driving mode is the half bridge mode, the first switching element and the second switching element are alternately turned on and turned off, and the fourth switching element is maintained on, and when the determined driving mode is the half bridge mode, the fifth switching element and the sixth switching element are alternately turned on and turned off, and the fourth switching element is maintained on.

7. The induction heating apparatus of claim 6, wherein when the container is determined to exist during the detection of the container by using the inner working coil, the controller determines the inner working coil to be driven, when the container is determined to exist during the detection of the container by using the outer working coil, the controller determines the outer working coil to be driven, and when the container is determined to exist during the detection of the container by using the inner working coil and during the detection of the container by using the outer working coil, the controller determines the inner working coil and the outer working coil to be driven.

8. The induction heating apparatus of claim 6, wherein when the determined driving mode is the full bridge mode, the first switching element and the fourth switching element are alternately turned on and off with the second switching element and the third switching element, and when the determined driving mode is the full bridge mode, the third switching element and the sixth switching element are alternately turned on and off with the fourth switching element and the fifth switching element.

* * * * *